United States Patent
Honary

(10) Patent No.: US 6,641,927 B1
(45) Date of Patent: Nov. 4, 2003

(54) SOYBEAN OIL IMPREGNATION WOOD PRESERVATIVE PROCESS AND PRODUCTS

(76) Inventor: Lou A. T. Honary, 2612 Minnetonka Dr., Cedar Falls, IA (US) 50613

( * ) Notice: Subject to any disclaimer, the term of this patent is extended or adjusted under 35 U.S.C. 154(b) by 0 days.

(21) Appl. No.: 10/064,901

(22) Filed: Aug. 27, 2002

Related U.S. Application Data

(60) Provisional application No. 60/315,230, filed on Aug. 27, 2001.

(51) Int. Cl.$^7$ .................................................. B32B 23/04
(52) U.S. Cl. ..................... 428/536; 428/537.1; 427/297; 427/298; 427/317; 427/440; 427/441; 427/443; 514/383; 508/491
(58) Field of Search .............................. 428/537.1, 536; 514/383; 508/491; 427/297, 298, 317, 440, 441, 443

(56) References Cited

U.S. PATENT DOCUMENTS

| | | | | |
|---|---|---|---|---|
| 1,203,038 A | | 10/1916 | Newton ........................ | 428/541 |
| 2,517,580 A | | 8/1950 | Lewis ......................... | 106/18 |
| 3,839,052 A | | 10/1974 | Peterson ..................... | 106/18.31 |
| 3,889,025 A | | 6/1975 | Peterson ..................... | 428/413 |
| 4,234,665 A | * | 11/1980 | Johnston ..................... | 428/541 |
| 4,649,065 A | | 3/1987 | Hein et al. .................. | 427/370 |
| 5,223,524 A | * | 6/1993 | Valcke ........................ | 514/383 |
| 5,397,795 A | * | 3/1995 | Valcke ........................ | 514/383 |
| 5,686,146 A | | 11/1997 | Nozoki ....................... | 427/297 |
| 5,714,507 A | * | 2/1998 | Valcke ........................ | 514/383 |
| 5,804,591 A | * | 9/1998 | Valcke ........................ | 514/383 |
| 5,958,851 A | | 9/1999 | Cannon et al. ............... | 508/491 |
| 5,972,855 A | | 10/1999 | Honary ....................... | 508/491 |
| 6,159,913 A | | 12/2000 | Cannon et al. ............... | 508/491 |
| 6,207,626 B1 | | 3/2001 | Cannon et al. ............... | 508/491 |

OTHER PUBLICATIONS

Fine Woodworking website—www.taunton.com—"Should Antique Furniture Be 'Fed' Linseed Oil?" –(5–01).

* cited by examiner

*Primary Examiner*—Leszek Kiliman
(74) *Attorney, Agent, or Firm*—Glenn Johnson

(57) ABSTRACT

A process for treating wood and wood products is disclosed. Wood is impregnated under pressure with soybean oil or a mixture of vegetable oils with soybean oil, which oil is caused to polymerize within the wood. The polymerized oil is effectively fixed within the wood. The oil may be treated in advance of impregnation to initiate polymerization. Further, the wood may be surface treated with a more fully polymerized coating of oil. Pressure and vacuum may be applied in selected sequence to promote impregnation, and heat, blowing air, oxygen, Ultraviolet light, and other agents may be employed to promote polymerization of the treated wood within the pressure chamber during the impregnation process or outside of the pressure chamber after impregnation. Additional additives may be used to prevent pest infestations and the growth of fungi or to promote the migration of the oil into the wood.

21 Claims, No Drawings

SOYBEAN OIL IMPREGNATION WOOD PRESERVATIVE PROCESS AND PRODUCTS

BACKGROUND OF INVENTION

This invention relates to an improved wood preservation process for the pressurized treatment of wood. The invention relates further to products treated by the same process.

A variety of processes and chemicals have been used to treat wood for preservation purposes. Illustrative U.S. patents showing known techniques and materials for the treatment of wood are U.S. Pat. Nos. 1,203,038, 2,517,580, 3,839,052, 3,889,025, 4,267,082, 4,637,952, 4,649,065, 4,923,760, 4,927,672, 5,013,748, 5,824,370, 6,123,756, 6,174,947B1. Many of these methods relate solely to surface treatments. Others relate to carriers or additives that have biocidal or other preservative functions.

Some conventional wood preservation techniques used for wood bearings, utility poles, railroad ties, landscape timbers, docking and marine structures, etc., rely on the impregnation of the wood with a liquid that may be a preservative or that may be a carrier doped with additives. Additives may be selected as appropriate for preservation in a selected environment (e.g. heavy metals and/or organic or inorganic substances such as copper naphthenate, or other wood preservatives used to repel animals such as rodents, to deter encrustation in marine environments, to deter the growth of bacteria, fungi, etc., or to protect the wood from other environmental factors). The liquids typically remain fluid even after they are forced into the wood and thus are prone to leakage from the wood. Also, chemical constituents of the preservative material may leech from the wood and, thus, be present on the surface of the treated wood.

Some of the preservatives used in the treatment of wood have chemical constituents that are toxic, carcinogenic and/or are not biodegradable. One of the most prevalent preservative agents in treated wood is Chromated Copper Arsenate (CCA) which contains arsenic a known carcinogen. Recently, the United States Environmental Protection Agency in cooperation with industry has adopted regulations that would prohibit the use of CCA treated wood from all residential applications including play-structures, decks, picnic tables, landscaping timbers, residential fencing, patios, walkways, boardwalks, and wood edging.

In addition to CCA treated wood, industry also currently uses a Copper Boron Azole (CBA) preservative. The active ingredients in copper azole are copper and tebuconazole. Copper azole is an EPA registered pesticide. Exposure to copper azole may present certain hazards as some chemical may migrate from the wood to the surrounding soil over time or may be dislodged from the wood surface upon contact with the skin. Another preservative used by the wood industry is Ammonia Copper Quaternary (ACQ).

The toxicity of the chemical preservatives, coupled with the constant leakage of the preservative material or leeching of constituents of the preservative to the surface of the treated wood and into the surrounding area may have adverse environmental, health, and/or infrastructure impacts. The current invention avoids all of these concerns when used without any pesticides and antifungal additives. Of course, pesticides and antifungal additives, or other additives, may be used with the current invention in applications where the treated wood would be exposed to adverse use conditions, or to promote the impregnation of the oil into the wood.

In addition to possible environmental risks and poor preservation performance, the low viscosity nature of typical wood preservative impregnation fluids causes additional labor and maintenance for the upkeep of material stocks. For example, when stored horizontally, wood pieces such as utility poles and railroad ties need to be turned periodically to prevent the fluid in the wood from being forced down and out of the wood by gravity. Further, fluid migration may leave installed wood products unprotected, as may be seen in telephone poles wherein the impregnated fluid has migrated downward and left the top dry and vulnerable. There is therefore a need for an improved wood preservation technology wherein carriers and additives in the carrier are less susceptible to migration from the wood that is being preserved. There is a further need for an improved wood preservation technology wherein the carrier itself is an environmentally friendly material. Finally, there is a need for an improved wood preservation technology wherein the carrier is an inexpensive material.

SUMMARY OF INVENTION

It has been discovered that polymerized soybean oils are especially effective in the pressurized treatment of wood products. In application, it has been determined that unrefined and refined soybean oil may be used. Further, it has been found that both the crude oil from genetically modified soybeans or and the crude oil from non-genetically modified soybeans is suitable for use. The method of preservation and the wood products that employ soybean oil preservation are advantageous because the soybean oil is more environmentally friendly; it is not toxic; and the use of polymerized soybean oil results in improved sequestration of the soybean oil and of any additives carried by the soybean oil to the interior of the treated wood.

The method of the present invention involves the application of soybean oil to wood under a pressure regime to drive the soybean oil into the wood. This preservative infusion process is well known to the industry. The pressure regime may involve the selective application of vacuum. The method further involves the promotion of polymerization of the soybean oil in-situ to increase viscosity and thereby fix the oil and any additives carried by the oil within the wood to prevent or minimize later leakage. Depending on the application and the potential detrimental effects of selected additives, it may be desired to promote a greater degree of polymerization throughout the wood to fully solidify the soybean oil or it may be desired to allow the soybean oil within the wood to remain slightly fluid and to promote or apply a more fully polymerized layer of soybean oil at the surface of the wood which solidifies to encapsulate the wood.

Of note, if the present invention is practiced to achieve a partially polymerized soybean oil followed by a more polymerized coating, a self-sealing characteristic is now present with the treated wood. This self-sealing characteristic is based upon a known property of soybean oil, namely a general lack of oxidative stability. When the outer coat of the wood treated with soybean oil is breached, the less fully polymerized soybean oil retained in the interior migrates to the surface. As it reaches the surface, it is exposed to the air where oxidation begins which will result in the solidification of the soybean oil (polymerization).

Depending on the application, the selected pressure chamber and pressure regime, and the wood to be preserved (density, pore size, etc.), it may be desired to prepare the soybean oil in advance of impregnation in order to initiate polymerization.

DETAILED DESCRIPTION

Although the present invention relates generally to the use of soybean oil in a pressurized wood impregnation regime and, ultimately, to internal and external preservation of wood with polymerized soybean oil, the preferred mode of application is as follows. The first step is the preparation of the oil for impregnation via partial oxidation to promote partial polymerization while maintaining sufficient liquidity to allow impregnation of the wood. The second step is the pressure application of the oil into the wood in a wood impregnation chamber. The third step, which in the preferred mode is combined with the second step, is the in-situ polymerization of the soybean oil as promoted through the application of heat. The fourth step is the application of a more fully oxidized layer of oil to the exterior of the wood with the application of heat, air and ultraviolet radiation for the promotion of more complete oxidation and, thus, solidification of the soybean oil to the outer surface of the wood.

Preparation of the Soybean Oil

The preferred oil is selected from the least stable of the soybean oils. A crude hexane extracted soybean oil for example would be preferred over a mechanically expelled crude soybean oil because the latter contains some of the natural antioxidants that slow oxidation. In the case of genetically modified soybeans, those varieties that contain lower levels of oleic acid content and/or higher levels of linolenic acid content are preferred. If used, mechanically expelled soybean oils should be filtered of the heavies to remove the natural preservatives and antioxidants present. The first step preferably is performed by using a combination of heat in excess of 100° C. (212° F.) combined with blowing or bubbling air or oxygen to at least partially oxidize the oil. Temperatures of greater than 150° C. (302° F.) are preferred and will help to accelerate the process, but may be avoided if safety issues are a concern. Of course, greater or lower temperatures and gas flow rates allow at least partial control of the rate of oxidation. Further, oxidation may be allowed to occur under ambient conditions if sufficient time may be permitted. The oil is preferably "pre-treated" up to a point where it is still fluid with a viscosity that will allow penetration into a selected wood sample, to a desired depth, under pressure conditions that may be achieved in a selected chamber. Of course, given the impact of energy costs, time constraints, equipment capabilities, and selected wood types, a user may vary the temperature, time, and oxygen supply as appropriate.

As is generally known in the art, there are multiple mechanisms responsible for the oxidation, hydrolysis, and polymerization of oils. Because many of the fatty acid residues in the triglycerides of oils contain carbon-carbon double bonds, it is possible to open these bonds and then readily polymerize the oils. In fact, polymerization is the most important commercial reaction of alkenes. These processes are accelerated in the presence of multiple chemical species including oxygen, water, metal particles, metal surfaces, and free acids (including those formed from the decomposition of triglycerides). In general, polymerization occurs when the double bonds on adjacent fatty acids break and then reform generating a new bond linking together adjacent molecules or moieties and also generating one or more new double bonds. This reaction can be intermolecular in a triglyceride, between a fatty acid moiety on a triglyceride and a free fatty acid, between fatty acid residues on different triglyceride molecules, or between two different free fatty acids. In the present invention, the pre-treatment or preparation of the oil is a beneficial step because the oxidation opens the double bonds to initiate polymerization and to facilitate easier polymerization of the oil at a later stage. Once polymerization is initiated in the wood it generally continues unless terminated by either gaps between pores and or upon full polymerization.

Impregnation of the Wood and Polymerization

In the second step, the impregnation of the wood, the soybean oil is forced into the wood in a pressure chamber. Preferably, a vacuum or decreased pressure is applied to degas the sample and maximize pore size prior to the application of the oil. In addition, the chamber or the oil may be heated to accelerate impregnation and to increase the level of penetration as well as to promote polymerization during the impregnation process. In a preferred embodiment, maple wood bearings are placed in an impregnation chamber and the pressure is decreased to twenty-four inches of Mercury (24" Hg) for 15 minutes to remove gases from the wood and to maximize pore sizes to facilitate penetration of oil into the wood. While refined soybean oil may be used, in the preferred embodiment unrefined soybean oil, heated to 74° C. (165° F.), is introduced into the chamber and pressurized to about 50–80 psi (depending on the characteristics of the wood such as, e.g., hardness) to impregnate the wood. The pressurized oil is circulated through a heater and reservoir for 30 minutes to maintain the temperature at 74° C. (165° F.). The oil is then depressurized and drained from the chamber. The pressure is then lowered to 24 Hg for about 10 minutes to drain excess oil from the wood.

Depending on the degree of saturation that is desired, pre- and post-impregnation vacuum application may be employed or eliminated. Further, it may be advantageous in a given pressure chamber configuration to at least partially isolate the step of impregnation (pressure application) from the step of in-situ polymerization which is promoted in this preferred embodiment by the application of heat.

In-situ polymerization of the oil during and after impregnation of the wood is promoted by the further application of heat within the pressure chamber. The amount and duration of heat to be applied varies depending upon the size of the wood under treatment, the nature of the wood, the type of oil used, and any advanced preparation of the oil.

Surface Treatment

In applications where the degree of polymerization for the oil in the wood interior leaves the oil at a viscosity that allows migration, it may be important to provide a solid surface coat of more fully polymerized oil to seal the wood. It has been discovered that the application of ultra-violet light, preferably within a heated drying chamber and preferably combined with air flow, is particularly beneficial for the polymerization of the outer or surface layer of soybean oil. As the soybean oil located at and migrating to the exterior surface of the treated wood polymerizes, it hardens creating a solid layer of protection to the exterior of the wood. This action operates to seal the wood and the preservative material within the interior of the treated wood. Alternatively, oil that has been allowed or caused to begin the process of polymerizing may be applied to the exterior surface after the wood is removed from the chamber with the preferable application of ultraviolet light, heat and air flow to promote rapid solidification of this surface layer of soybean oil. As indicated above, soybean oil is particularly advantageous because, in the event that the surface coat is later breached, interiorly located oil will migrating to the surface breach where it will polymerize and solidify upon exposure to the atmosphere, thus sealing the breach.

It is also possible for those expert in the art to combine one or more of other vegetable oils with the soybean oil to obtain the same results.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A method for the treatment of wood comprising:

pressurizing a chamber containing wood and soybean oil to force the soybean oil into the wood, and promoting polymerization of the soybean oil within the wood.

2. The method of claim 1 wherein:

the soybean oil is conditioned before the wood and the soybean oil are combined in the chamber.

3. The method of claim 2 wherein:

the soybean oil is conditioned by being blown with air or oxygen.

4. The method of claim 2 wherein:

the soybean oil is conditioned by being heated.

5. The method of claim 2 wherein:

the soybean oil is conditioned by being exposed to ultraviolet light.

6. The method of claim 2 wherein:

the soybean oil may be mixed with a number of chemical enhancers for the protection of the wood from fungi, rodents, insects, light, algae, and animals.

7. The method of claim 2 wherein:

the soybean oil may be mixed with a chemical accelerants to facilitate impregnation and to accelerate oxidation.

8. The method of claim 1 wherein:

soybean oil is combined with other vegetable oils prior to the infusion of the mixed oils into the wood.

9. The method of claim 1 wherein:

heat is applied to the chamber when the chamber is pressurized to promote the in-situ polymerization of the soybean oil.

10. The method of claim 1 wherein:

the wood is removed from the chamber and heat is applied to the wood to promote the in-situ polymerization of the oil.

11. The method of claim 1 wherein:

the wood is removed from the chamber and a layer of more fully polymerized soybean oil is applied to a surface of the wood.

12. The method of claim 1 wherein:

the wood is removed from the chamber, and further polymerization of soybean oil on a surface of the wood is promoted.

13. The method of claim 9 wherein:

the further polymerization is promoted through the application of heat.

14. The method of claim 9 wherein:

the further polymerization is promoted through the application of blowing air.

15. The method of claim 9 wherein:

the further polymerization is promoted through the application of ultraviolet light.

16. The method of claim 9 wherein:

the further polymerization is promoted through the application of a chemical agent.

17. The method of claim 4 wherein:

the soybean oil is conditioned by heating to a temperature of 74° C. (165° F.), and the temperature of the soybean is constantly maintained at 74° C. while it is being continuously circulated within the pressure chamber during the wood treatment process.

18. Treated wood for use in exterior construction and selected interior construction, said treated wood consisting of:

wood impregnated with soybean oil.

19. The treated wood of claim 18 said wood having an interior and an exterior, wherein the soybean oil is more fully polymerized so as to solidify and be retained as dispersed throughout the interior of the wood.

20. The treated wood of claim 18, said wood having an interior and an exterior, wherein:

the soybean oil dispersed throughout the interior of the wood is partially polymerized and remains in a liquid state, and the exterior of the wood is encapsulated with solidified soybean oil resulting from a more fully polymerized state.

21. The treated wood of claim 18 wherein the wood is impregnated with a combination of soybean oil and other vegetable oils.

* * * * *